(12) United States Patent
Lee

(10) Patent No.: US 11,854,221 B2
(45) Date of Patent: Dec. 26, 2023

(54) POSITIONING SYSTEM AND CALIBRATION METHOD OF OBJECT LOCATION

(71) Applicant: Wistron Corporation, New Taipei (TW)

(72) Inventor: Yu-Cheng Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 18 days.

(21) Appl. No.: 17/694,688

(22) Filed: Mar. 15, 2022

(65) Prior Publication Data

US 2023/0222681 A1 Jul. 13, 2023

(30) Foreign Application Priority Data

Jan. 13, 2022 (TW) ................................. 111101383

(51) Int. Cl.
*G06T 7/70* (2017.01)
*G01S 19/48* (2010.01)

(52) U.S. Cl.
CPC .............. *G06T 7/70* (2017.01); *G01S 19/485* (2020.05); *G06T 2207/30236* (2013.01)

(58) Field of Classification Search
CPC ....................................................... G06T 7/70
USPC ......................................................... 348/143
See application file for complete search history.

(56) References Cited

U.S. PATENT DOCUMENTS

2020/0193643 A1* 6/2020 Hess ...................... G06V 10/44

FOREIGN PATENT DOCUMENTS

| CN | 111783502 | 10/2020 |
| CN | 113284193 | 8/2021 |
| CN | 113284194 | 8/2021 |

OTHER PUBLICATIONS

"Office Action of Taiwan Counterpart Application", dated Jan. 11, 2023, p. 1-p. 5.
"Office Action of Europe Counterpart Application", dated Jan. 19, 2023, p. 1-p. 6.
"Search Report of Europe Counterpart Application", dated Sep. 13, 2022, p. 1-p. 4.

* cited by examiner

*Primary Examiner* — Amir Shahnami
(74) *Attorney, Agent, or Firm* — JCIPRNET

(57) ABSTRACT

A positioning system and a calibration method of an objection location are provided. The calibration method includes the following. Roadside location information of a roadside unit (RSU) is obtained. Object location information of one or more objects is obtained. The object location information is based on a satellite positioning system. An image identification result of the object or the RSU is determined according to images of one or more image capturing devices. The object location information of the object is calibrated according to the roadside location information and the image identification result. Accordingly, the accuracy of the location estimation may be improved.

20 Claims, 15 Drawing Sheets

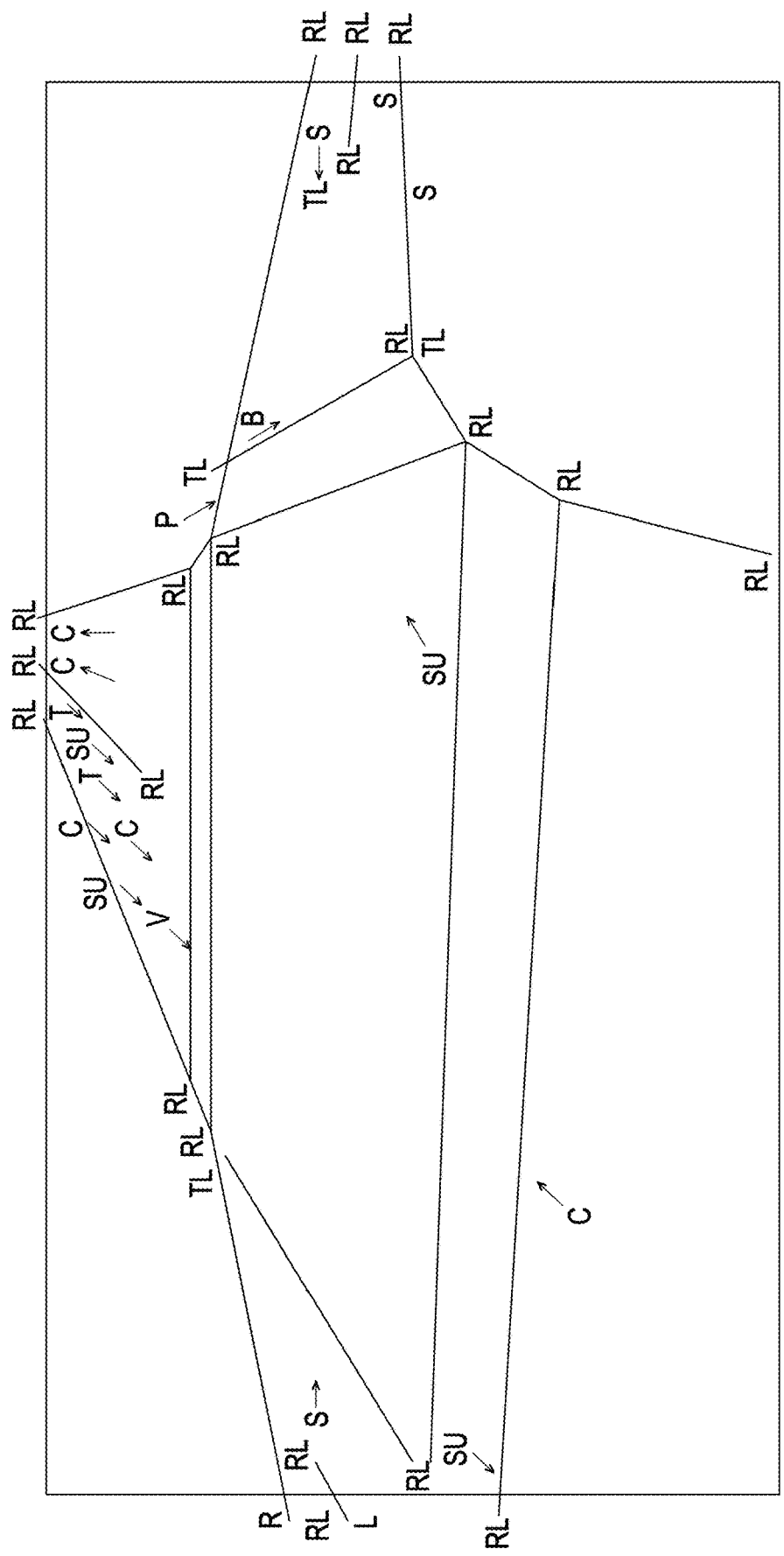

POSITIONING SYSTEM AND CALIBRATION METHOD OF OBJECT LOCATION

CROSS-REFERENCE TO RELATED APPLICATION

This application claims the priority benefit of Taiwanese application no. 111101383, filed on Jan. 13, 2022. The entirety of the above-mentioned patent application is hereby incorporated by reference herein and made a part of this specification.

BACKGROUND

Technical Field

The invention relates to a positioning technique, and particularly relates to a positioning system and a calibration method of an object location.

Description of Related Art

A roadside unit (RSU) may collect road condition information of vehicles on a road. However, on a road without an RSU or on a road outside a monitoring range of the RSU, a vehicle needs to sense surrounding vehicles, pedestrians, or public facilities through their own sensing devices. It should be noted that the sensing devices may be mutually interfered with each other and are limited by a data processing amount and a scanning area.

On the other hand, drawbacks of the aforementioned technique may reduce accuracy of location estimation. Therefore, a detection result on an electronic map may include, for example, object drifting, movement discontinuity, or movement outside the road. In addition, road users may only know conditions around them, but cannot learn conditions outside a field of vision. Therefore, an early warning of an accident is difficult.

SUMMARY

The invention is directed to a positioning system and a calibration method of an object location, in which positioning accuracy is improved with additional reference to an image identification result.

An embodiment of the invention provides a calibration method of an object location, and the method including (but is not limited to) the following. Roadside location information of one or more roadside units (RSU) are obtained. Object location information of one or more objects are obtained. The object location information is based on a satellite positioning system. An image identification result of the object or the RSU is determined according to an image of one or more image capturing devices. The object location information of the one or more objects is calibrated according to the roadside location information and the image identification result.

An embodiment of the invention provides a positioning system including (but is not limited to) one or more roadside units (RSU), one or more image capturing devices, and a computing device. The roadside unit is configured to provide roadside location information. The image capturing device is configured to provide an image. The computing device is configured to obtain the roadside location information of the one or more roadside units, obtain object location information of one or more objects, and calibrate the object location information of the one or more objects according to the roadside location information and an image identification result. The object location information is based on a satellite positioning system. The image identification result is for the object or the roadside unit and is determined according to the image of the image capturing device.

Based on the above description, in the positioning system and the calibration method of an object location according to the embodiments of the invention, the image identification result and the location based on the satellite positioning system are merged to accordingly obtain a more accurate location, thereby enhancing an early warning mechanism.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is an image identification result of FIG. 6.

DESCRIPTION OF THE EMBODIMENTS

Figure 1:
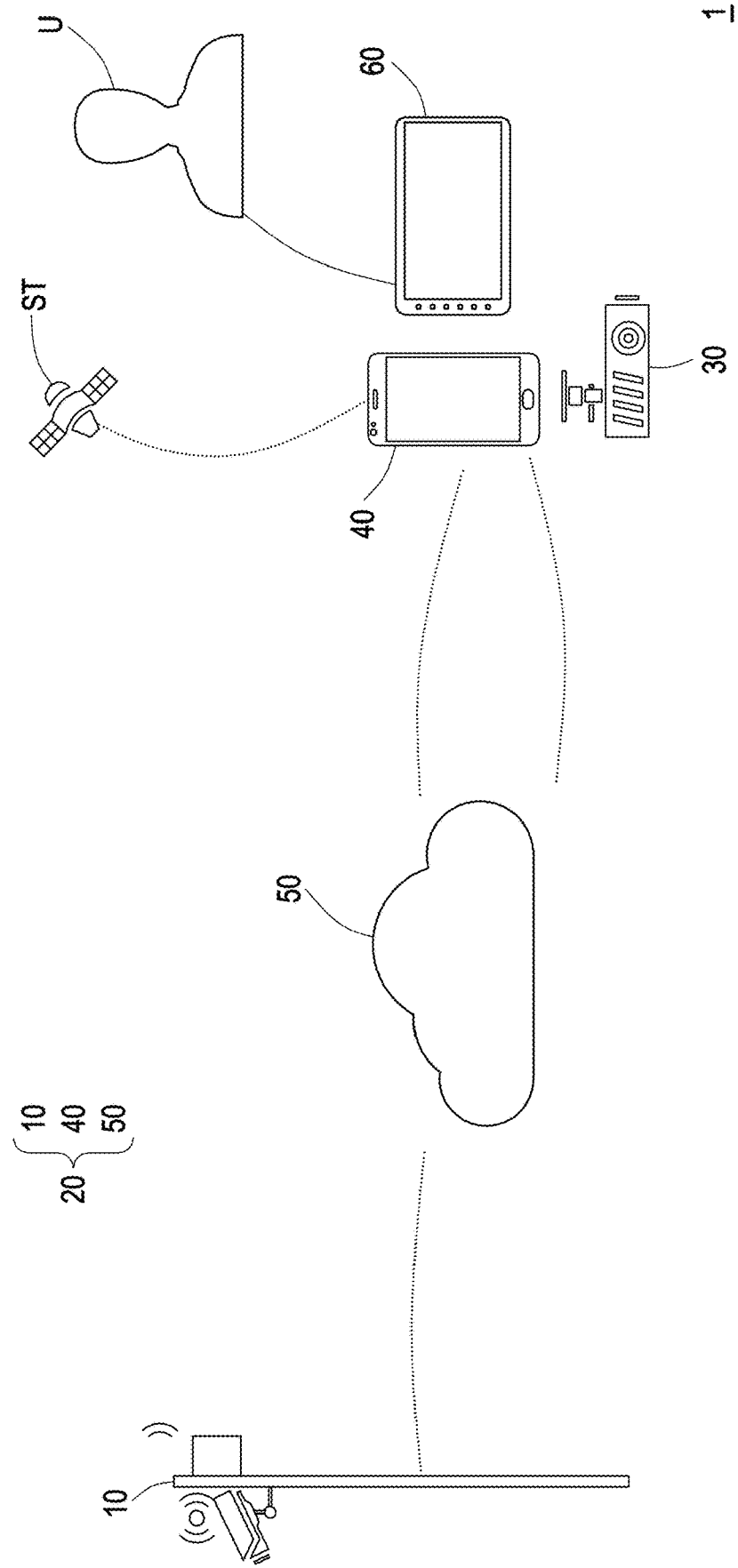
FIG. 1 is a schematic diagram of a positioning system according to an embodiment of the invention.

FIG. 1 is a schematic diagram of a positioning system 1 according to an embodiment of the invention. Referring to FIG. 1, the positioning system 1 includes (but is not limited to) a roadside unit 10, an image capturing device 30, a mobile device 40, a mobile device 60, a cloud server 50, and a positioning satellite ST. It should be noted that the number and location of each device in FIG. 1 are only for illustration and may be adjusted according to actual needs.

The roadside unit 10 may be installed on a signal light, a street light, an electrical box, other equipment or a building. In an embodiment, the roadside unit 10 may support Wi-Fi, Bluetooth, or other communication technologies to communicate with other devices. In one embodiment, the image capturing device 30 photographs a road, an entrance and exit or a specific area to obtain images. In an embodiment, the roadside unit 10 may include the image capturing device 30. In an embodiment, the roadside unit 10 may be positioned through the positioning satellite ST based on any type of global navigation satellite system (GNSS) or positioned directly through an electronic map to accordingly obtain its own location (coordinates or a relative position).

In an embodiment, the image capturing device 30 may be a camera, a video camera or a monitor, which is adapted to capture images within a specified field of view.

The mobile devices 40 and 60 may be an on-board units (OBU), smart phones, tablet computers, wearable devices, or sensing devices. In an embodiment, the mobile device 40 may be installed in a vehicle or other transport means, or a user U may carry the mobile device 60. In an embodiment, the mobile device 40 and/or the mobile device 60 includes the image capturing device 30. In an embodiment, the mobile device 40 and/or the mobile device 60 may obtain its own location (for example, coordinates or relative position) through the positioning satellite ST.

The cloud server 50 may be a computer system, a workstation, or a backend host. In one embodiment, the cloud server 50 may communicate with the roadside unit 10 and the mobile devices 40 and 60 via a network (for example, the Internet, a local area network, or a private network) or Bluetooth.

In order to facilitate understanding of operation processes of the embodiment of the invention, a plurality of embodiments are provided below to describe in detail the operation process of each device in the positioning system 1 of the embodiment of the invention. It should be noted that some or all of the following operations may be performed by a computing device 20, and the computing device 20 may be the roadside unit 10, the mobile devices 40 and 60, the cloud server 50 or an edge computing device. Therefore, an execution subject hereinafter is only used for illustration, which may still be replaced by other computing devices 20.

Figure 2:
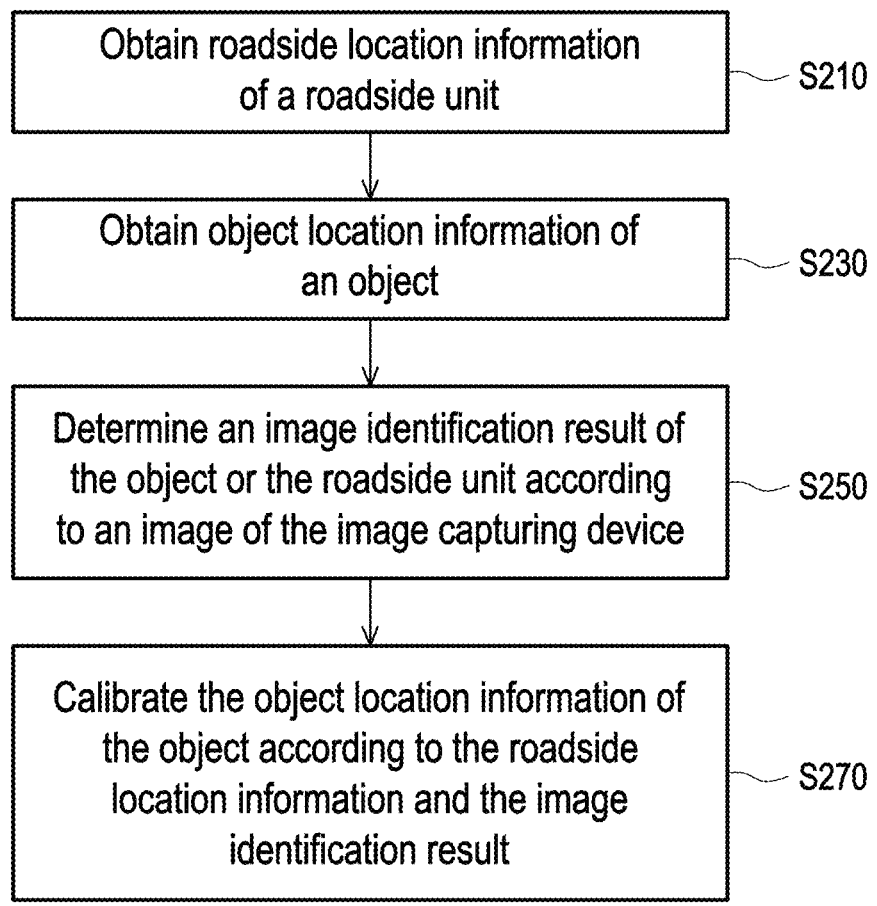
FIG. 2 is a flowchart of calibration method of an object location according to an embodiment of the invention.

FIG. 2 is a flowchart of calibration method of an object location according to an embodiment of the invention. Referring to FIG. 2, the computing device 20 obtains roadside location information of one or more the roadside units 10 (step S210). In an embodiment, the roadside location information is a location of the roadside unit 10. For example, the roadside unit 10 obtains global positioning system (GPS) coordinates or coordinates of other satellite positioning systems through the positioning satellite ST. For another example, the computing device 20 acquires the coordinates of the roadside unit 10 on an electronic map. For another example, the computing device 20 may estimate a distance of the roadside unit 10 relative to the mobile device 40 through signal strength of near-field communication (NFC), Bluetooth or other wireless communication technologies. For still another example, the computing device 20 may estimate relative distances of surrounding objects through a depth camera or a distance sensor.

In another embodiment, the roadside location information is an object estimation location of one or more objects. The object may be the roadside unit 10 or the mobile device 40 or 60, or any type of vehicle, animal, building, plant, or equipment. The object estimation location is location information estimated according to an image identification result and the object location information based on the satellite positioning system, which will be described in detail in the following embodiments.

The computing device 20 obtains object location information of one or more objects (step S230). To be specific, the objects are configured with or carry the mobile device 40 or the mobile device 60, so that the mobile device 40 or the mobile device 60 may obtain the object location information of the object through the positioning satellite ST based on the satellite positioning system. For example, an on-board unit of a vehicle obtains the GPS coordinates, and reports the GPS coordinates to the cloud server 50 in response to an event (for example, a timer, a moving speed, an accident, or manual trigger). For another example, the cloud server 50 shares the GPS coordinates of the mobile device 40 with the roadside unit 10.

In an embodiment, the object location information corresponds to an identification code of the object. The identification code is, for example, a mobile device identification code, a machine identification code, or other device identification information. For example, the coordinate information reported by the mobile device 40 further includes an international mobile equipment identity (IMEI).

In an embodiment, the object location information corresponds to a timestamp. The timestamp records an obtaining or transmitting time of the object location information.

In some embodiments, the mobile device 40 may also provide motion information such as speed, direction, etc.

The computing device 20 determines the image identification result of the object or the roadside unit 10 according to images of one or more image capturing devices 30 (step S250). To be specific, the computing device 20 may implement object detection based on a neural network algorithm (for example, YOLO, region based convolutional neural networks (R-CNN), or fast R-CNN) or an algorithm based on feature matching (for example, histogram of oriented gradient (HOG), Harr, or feature comparison of speeded up robust features (SURF)), and accordingly identify a type (for example, a person, a bicycle, a truck, a car, or a brand), an appearance (for example, a color, or a shape) and/or identification information (for example, a license plate, or other object features, which are also referred to as labels) of the object.

In an embodiment, the image identification result is a location of the roadside unit 10 in the image (which is also referred to as a pixel location). For example, a two-dimensional coordinate system is formed based on locations of pixels in the image, and two-dimensional coordinates may represent the locations of the pixels in the image. In an embodiment, the image identification result is a location of the object in the image (which is also referred to as a pixel location). In an embodiment, the image identification result is a number of the objects. In an embodiment, the image identification result is motion information of the object, for example, a speed or a moving direction. In some embodiments, the location of the aforementioned object or the roadside unit 10 in the image may be coordinates of a representative position. The representative position may be a center of a lower edge, a center point, or any point within an outline of the object.

In an embodiment, each image or the image identification result corresponds to a timestamp. The timestamp records an obtaining or transmitting time of the image or the image identification result. In an embodiment, the image or the image identification result corresponds to lens information of the image capturing device 30. The lens information may be a lens resolution, a field of view, or a lens curvature.

The computing device 20 calibrates the object location information of the object according to the roadside location information and the image identification result (step S270). To be specific, since the object location information obtained through the satellite positioning may have errors, the object location information may be further calibrated through other information. Different to radar or lidar, the embodiment of the invention relies on the image identification result.

Figure 3:
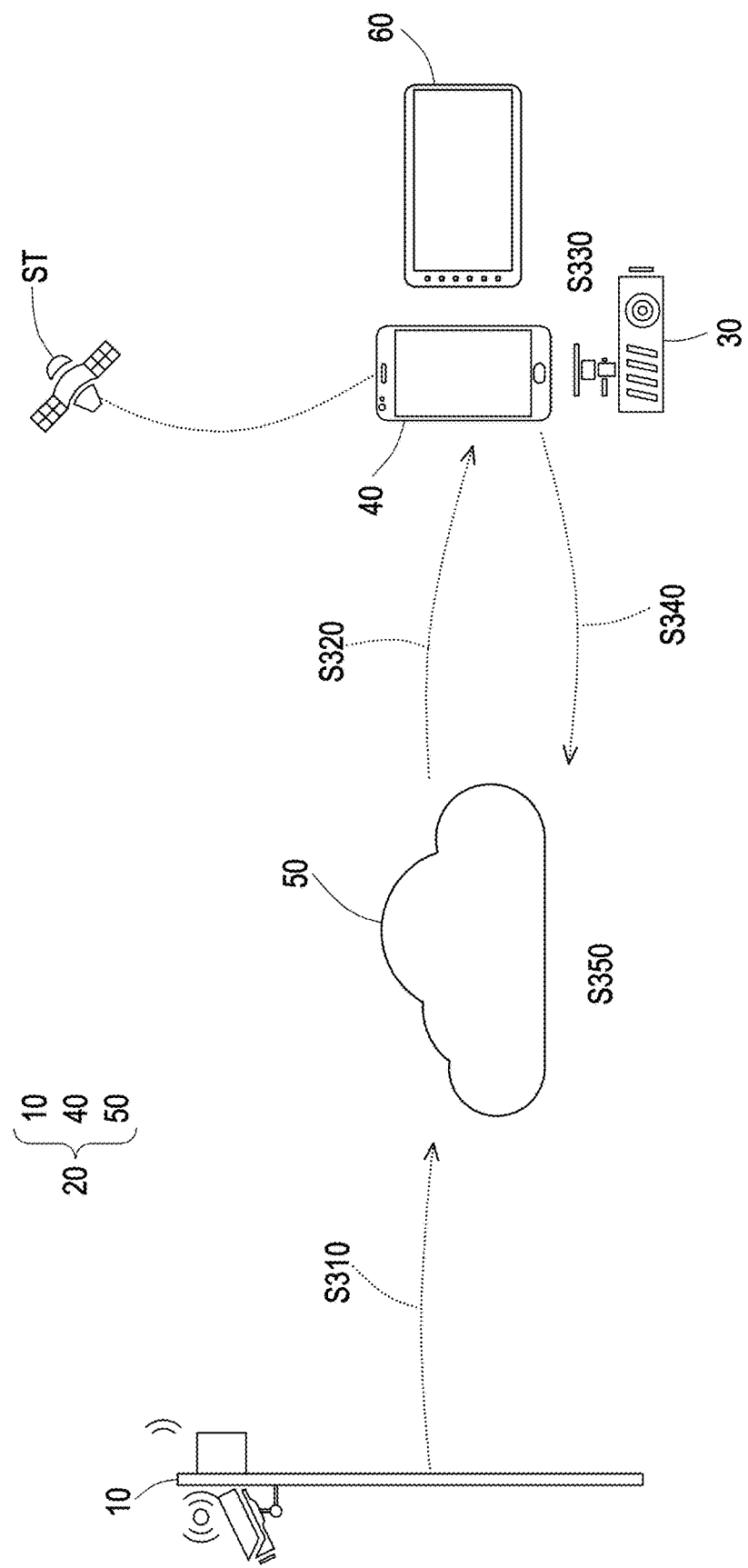
FIG. 3 is a schematic diagram showing process flows of a calibration method according to an embodiment of the invention.

Two embodiments are provided below to illustrate location calibration. FIG. 3 is a schematic diagram showing process flows of a calibration method according to an embodiment of the invention. Referring to FIG. 3, the roadside unit 10 uploads the roadside location information (step S310), and the roadside location information is the location of the roadside unit 10. Since the roadside unit 10 is usually fixed, the computing device 20 may regard the location of the roadside unit 10 as a correct location and take the same as a reference anchor point. The cloud server 50 may share the roadside location information to the mobile device 40 (step S320).

Figure 4A:
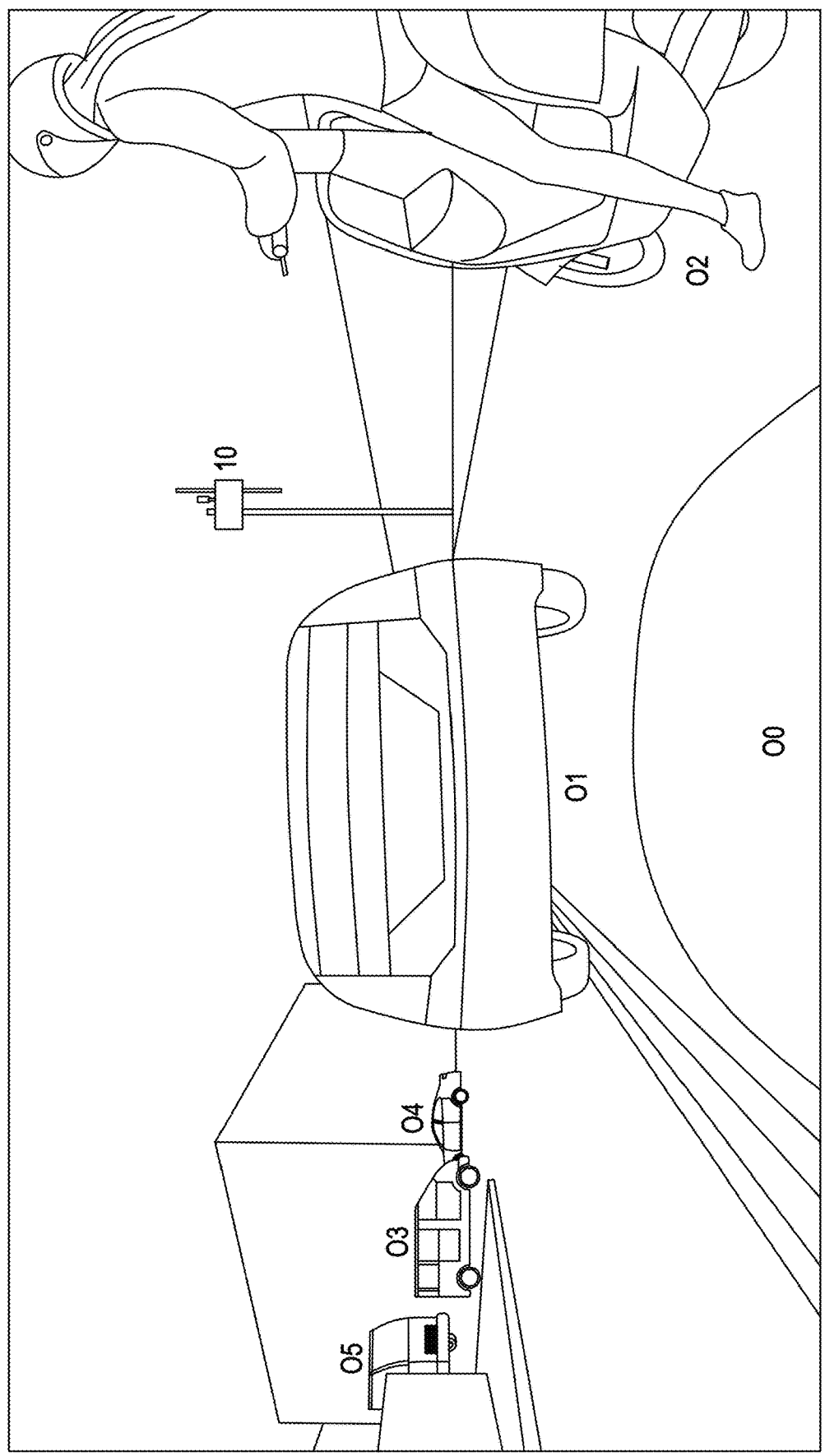
FIG. 4A is a schematic diagram of an image identification result according to an embodiment of the invention.
Figure 4B:
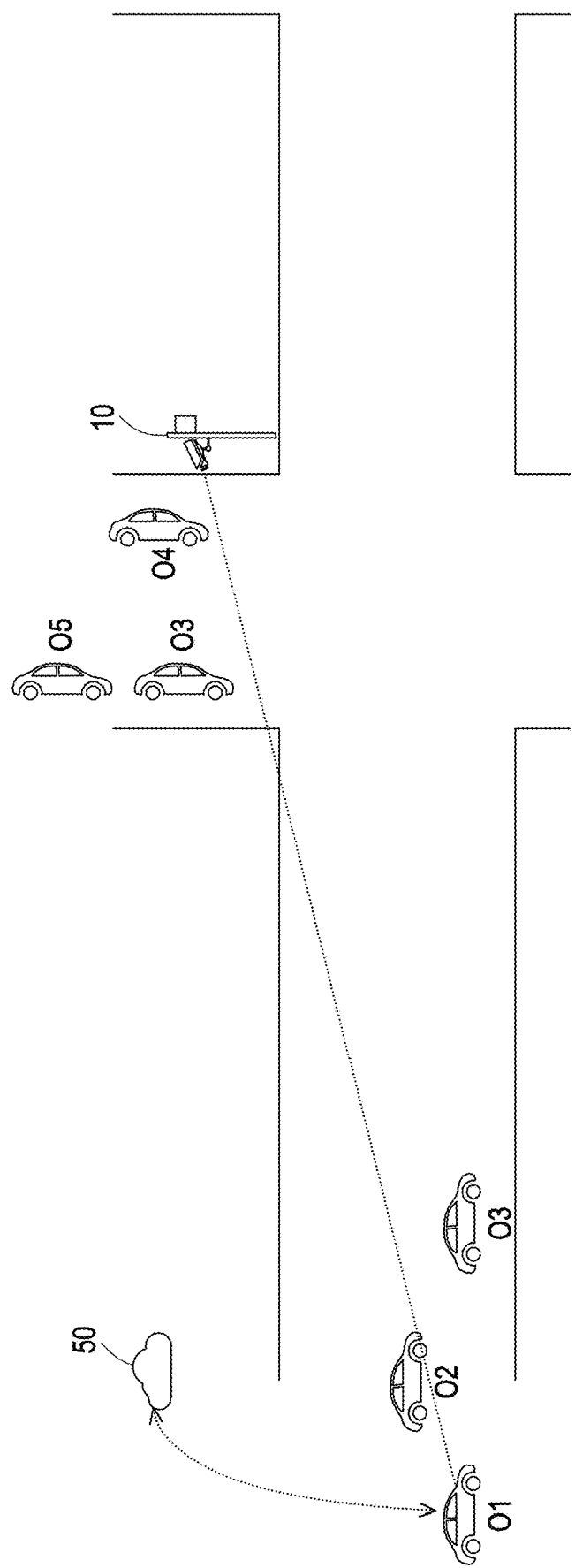
FIG. 4B is a schematic diagram of locations of objects and a roadside unit according to an embodiment of the invention.

Moreover, the image identification result is a location of the roadside unit 10 in the image captured by the image capturing device 30 of the mobile device 40. For example, FIG. 4A is a schematic diagram of an image identification result according to an embodiment of the invention, and FIG. 4B is a schematic diagram of locations of objects and the roadside unit according to an embodiment of the invention. Referring to FIG. 4A and FIG. 4B, it is assumed that the mobile device 40 is installed on an object O0, and the image capturing device 30 of the mobile device 40 may capture objects O1 to O5 and the roadside unit 10. A location of the roadside unit 10 in the image (for example, a center of a bottom side of the roadside unit 10 is used as a location representative point) may be used as the image identification result. In addition, a following Table (1) is the image identification result based on the image captured by the image capturing device 30 on the object O0:

TABLE 1

| Device ID | Number of surrounding objects | Object referential number | Object color | Pixel location of object |
|---|---|---|---|---|
| ID1 | 5 | O1 | White | (620, 480) |
|  |  | O2 | White | (1196, 685) |
|  |  | O3 | Yellow | (213, 370) |
|  |  | O4 | Yellow | (320, 350) |
|  |  | O5 | White | (130, 350) |

| Object type | Timestamp | Identification information | Note | Lens resolution |
|---|---|---|---|---|
| Car | 1315897287 | AAY-8186 | Front camera | 1280 × 720 |
| Moto | 1315897287 | Unknown | Front camera | 1280 × 720 |
| Vehicle | 1315897287 | Unknown | Front camera | 1280 × 720 |
| Vehicle | 1315897287 | Unknown | Front camera | 1280 × 720 |
| Truck | 1315897287 | Unknown | Front camera | 1280 × 720 |

In an embodiment, ID1 may be a unique device identification code (for example, an identification code of the object) of the mobile device 40, such as IMEI. The computing device 20 (taking the mobile device 40 as an example) may determine a first location conversion relationship between the roadside location information and the image identification result. The first location conversion relationship is a conversion function or a comparison table between the roadside location information based on satellite positioning and pixel locations. Namely, by inputting the location of the roadside unit 10 in the image into the first location conversion relationship, the location (for example, GPS coordinates) of the roadside unit 10 may be obtained.

In an embodiment, a coordinate distance between the roadside location information and the object location information of the object is related to the first location conversion relationship. Taking Table (1) as an example, a coordinate distance between the roadside unit 10 and the object O0 is used as a variable factor of the first location conversion relationship. In this way, the computing device 20 uses the coordinate distance to correct an error of an image estimation location, thereby improving the accuracy of an estimated value.

For example, in an embodiment, ID2 is the unique device identification code of the mobile device 40. The roadside unit 10 is at a location in the image captured by the image capturing device 30 of the mobile device 40 on the object O1. It is assumed that the mobile device 40 is also installed on the object O1, and the image capturing device 30 thereof may capture the objects O3 to O5 and the roadside unit 10. The location of the roadside unit 10 in the image may be used as the image identification result. Moreover, Table (2) is the image identification result based on the image captured by the image capturing device 30 on the object O1:

TABLE 2

| Device ID | Number of surrounding objects | Object referential number | Object color | Pixel location of object |
|---|---|---|---|---|
| ID2 | 3 | O3 | Yellow | (213, 370) |
|  |  | O4 | Yellow | (320, 350) |
|  |  | O5 | White | (130, 350) |

TABLE 2-continued

| Object type | Timestamp | Identification information | Note | Lens resolution |
|---|---|---|---|---|
| Vehicle | 1315897287 | Unknown | Front camera | 1280 × 720 |
| Vehicle | 1315897287 | Unknown | Front camera | 1280 × 720 |
| Truck | 1315897287 | Unknown | Front camera | 1280 × 720 |

Besides, since the computing device 20 may compare the identification results and table contents returned by different mobile devices 40 (for example, Table (1), Table (2), but it may also be the identification result and table content returned by the mobile device 40 on the object), and take the common roadside unit 10 as a reference point at the same timestamp, the computing device 20 may obtain a relative location and a front-to-back relationship between the object O1 and the object O0 through comparison. In this way, the accuracy of the estimated value may be improved according to the return results of more different mobile devices 40.

In an embodiment, the image capture device 30 captures a plurality of images, and these images correspond to a plurality of different timestamps. The computing device 20 may determine an object estimation location under different timestamps according to the first location conversion relationship of the timestamps. Along with movement of the object, pixel locations of the same object at different time points may be changed. The different pixel locations may correspond to different coordinate distances. For example, when the timestamp is 1315897287, a pixel location (230, 700) of the roadside unit 10 corresponds to a coordinate distance d and a first location conversion relationship; when the timestamp is 1315897288, a pixel location (231,704) of the roadside unit 10 corresponds to the coordinate distance d1 and another first location conversion relationship. Under different timestamps, if there are more first location conversion relationships between the pixel location and the object location information obtained by the computing device 20, to use the conversion relationship with the same or close timestamp will help to provide a more accurate estimation location.

Referring back to FIG. 3, the computing device 20 may convert the location of the object in the image into the corresponding object estimation location according to the first location conversion relationship (step S330), and calibrate the object location information accordingly. Namely, the computing device 20 may calibrate the object location information purely based on the satellite positioning system according to the first location conversion relationship. To be specific, in addition to the location of the roadside unit 10, the image identification result may further include locations of other objects (which are referred to as surrounding objects hereinafter). The computing device 20 may convert the locations of the surrounding objects in the image into object estimation locations (for example, GPS coordinates) according to the first location conversion relationship.

In addition, the mobile device 40 may provide the object estimation locations of the surrounding objects and its own location to the cloud server 50 (step S340). The cloud server 50 may also share the aforementioned locations to other devices (step S350). The object estimation locations may replace the object location information reported by other devices or used to calibrate the object location information according to a weight relationship.

Figure 5:
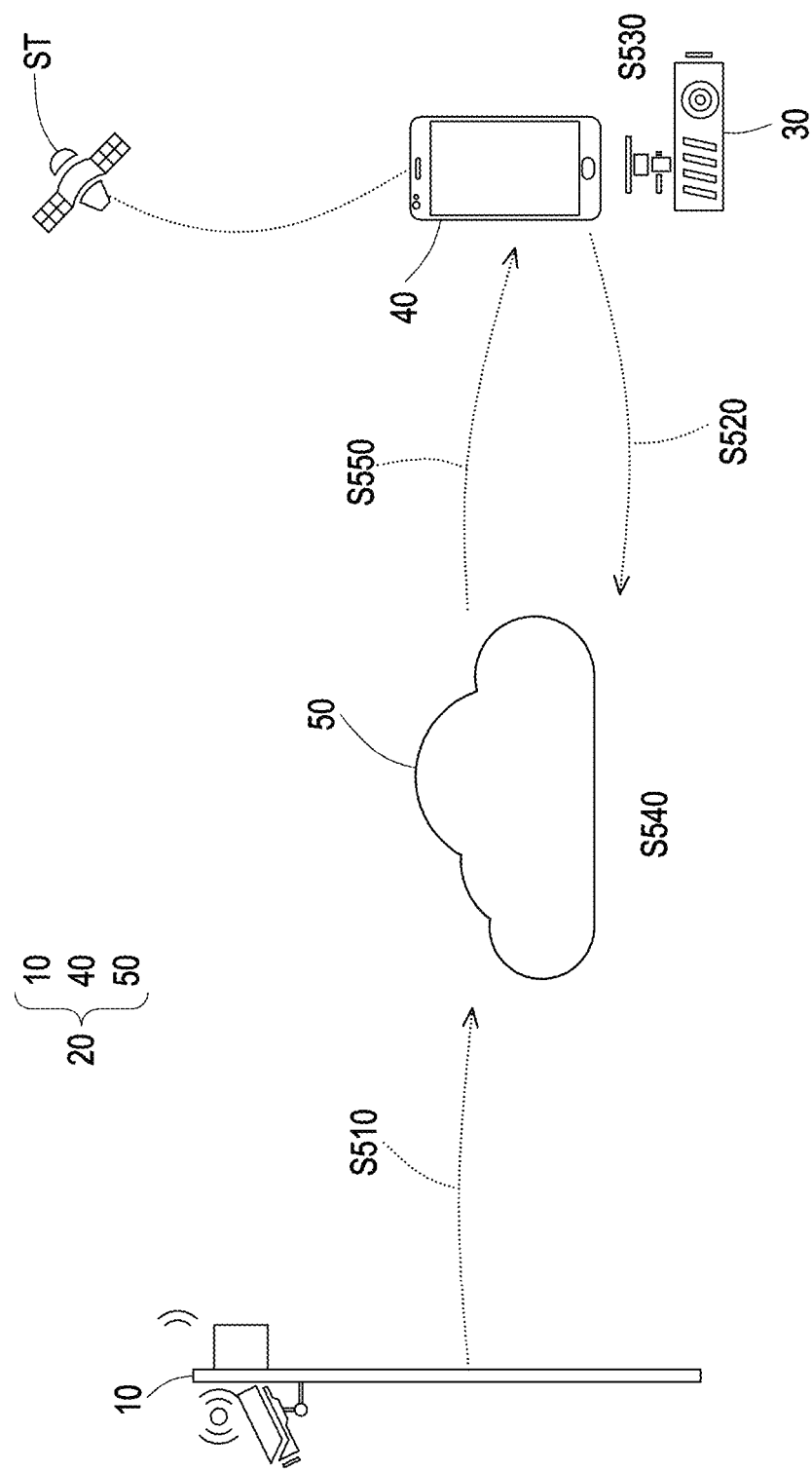
FIG. 5 is a schematic diagram showing process flows of a calibration method according to another embodiment of the invention.

FIG. 5 is a schematic diagram showing process flows of a calibration method according to another embodiment of the invention. Referring to FIG. 5, the mobile device 40 may return the image captured by the image capturing device 30 of the mobile device 40 or the image identification result obtained based on the image to the cloud server 50 (step S510). In addition, the mobile device 40 may report the object estimation locations of surrounding objects and the corresponding timestamp to the cloud server 50 (step S520). For determination of the object estimation location, reference may be made to the above-mentioned embodiment of FIG. 3, which is not repeatedly described here.

On the other hand, the roadside unit 10 uploads the roadside location information (step S530), and the roadside location information is the object estimation location of the object obtained by the roadside unit 10. Similarly, since the roadside unit 10 is generally stationary, the roadside unit 10 may use its own location (for example, GPS coordinates) as the correct reference coordinates. The roadside unit 10 may determine the first location conversion relationship based on the correct reference coordinates and a pixel location of its own image capturing device 30 in the image, and calculate the object estimation locations of other objects according to the first position conversion relationship.

Figure 6:
FIG. 6 is a schematic diagram of an image captured by an image capturing device of a roadside unit according to an embodiment of the invention.

For example, FIG. 6 is a schematic diagram of an image captured by the image capturing device 30 of the roadside unit 10 according to an embodiment of the invention. Referring to FIG. 7A, FIG. 7A is an image identification result of FIG. 6. The image identification results include motorcycles S, sport utility vehicles SU, a van V, cars C, trucks T, a pedestrian P, a bicycle B, traffic lights TL and road lines RL. Moreover, arrows in FIG. 7A indicate moving directions of the objects. It should be noted that in addition to the roadside unit 10, the traffic lights TL and the road lines RL may also be used as reference anchor points and used to estimate the first location conversion relationship. The roadside unit 10 may determine the object estimation locations of the surrounding objects based on the first location conversion relationship. The roadside unit 10 may report the obtained object estimation locations of the surrounding objects, the image identification result and the corresponding timestamp to the cloud server 50.

The computing device 20 (taking the cloud server 50 as an example) may match the roadside location information with the object estimation locations from the mobile device 40 (step S540). To be specific, the object estimation locations provided by the roadside unit 10 may correspond to its own image identification result, and matching of the object estimation locations provided by the mobile device 40 may also correspond to its own image identification result. In an embodiment, the image identification result further includes types, appearances and/or identification information (for example, a license plate number) of the objects. The computing device 20 may map the object estimation locations in the roadside location information to the object estimation locations with the same or similar timestamp reported by other devices according to the types, appearances and/or identification information of the objects. For example, the computing device 20 may compare object colors and license plate numbers in the image identification results of the roadside unit 10 and the mobile device 40 to confirm that the two object estimation locations are for the same object.

In another embodiment, each object location information corresponds to an identification code of one object. Taking Table (1) as an example, the device identification codes may be used to distinguish different objects. Therefore, the computing device 20 may map the object estimation locations in the roadside location information to the object estimation locations with the same or similar timestamps reported by other devices according to the identification code of the object. Taking Table (1) as an example, the computing device 20 may look for the roadside location information and the object estimation location whose device identification code is ID1 among the object estimation locations from the object O0, so as to confirm that the object estimation location is for the object O1.

It should be noted that if the object estimation location does not match (or cannot be mapped), it means that the object with the object estimation location may be located in a blind area of view of other devices. Therefore, even if the image capturing device 30 of the roadside unit 10 or the mobile device 40 does not capture some objects, the roadside unit 10 or the mobile device 40 may learn existence and locations of these objects through the image identification results of other devices.

The computing device 20 may further use the roadside location information to calibrate the object estimation locations reported by other devices, and return a calibrated result to the mobile device 40 (step S550). For example, the object estimation locations in the roadside location information are used as reference locations, which may be further compared with the object estimation locations from other devices to obtain errors, and these errors may be used as references for location calibration performed by other devices. In some embodiments, it is assumed that a lens resolution of the roadside unit is poor or has poor image identification result, the computing device 20 may further use the object estimation locations of the mobile device 40 to calibrate the roadside location information, and return the calibrated result to the roadside unit 10.

In an embodiment, the computing device 20 (taking the mobile device 40 as an example) may determine a second location conversion relationship between the roadside location information and the image identification result. The second location conversion relationship is a conversion function or a comparison table between object estimation locations and pixel locations. Namely, by inputting a location of the object in the image into the second location conversion relationship, an actual location (for example, the GPS coordinates) of the object is obtained.

The computing device 20 may determine preliminary estimation location information of objects according to the image identification result. The preliminary estimation location information is, for example, object estimation locations of the surrounding objects obtained by the mobile device 40 based on the first location conversion relationship. Namely, the locations of the objects in the image identification result in the image are converted into the object estimation locations through the first location conversion relationship. The computing device 20 may determine the second location conversion relationship according to an error between the preliminary estimation location information and the roadside location information. For example, the mobile device 40 may determine an error of the object estimation locations obtained by itself according to the calibrated result of the cloud server 50. When the calibrated result reaches a certain number, the mobile device 40 may calculate the second location conversion relationship. Compared with the first location conversion relationship used by the mobile device 40 at the beginning, the second location conversion relationship further considers an error with the roadside unit 10, which helps to improve the accuracy of the location estimation. In addition, the computing device 20 may calibrate the object location information purely based on the satellite positioning system according to the second location conversion relationship. For example, the object estimation locations obtained based on the second location conversion relationship are used to replace the object location information.

Figure 7B:
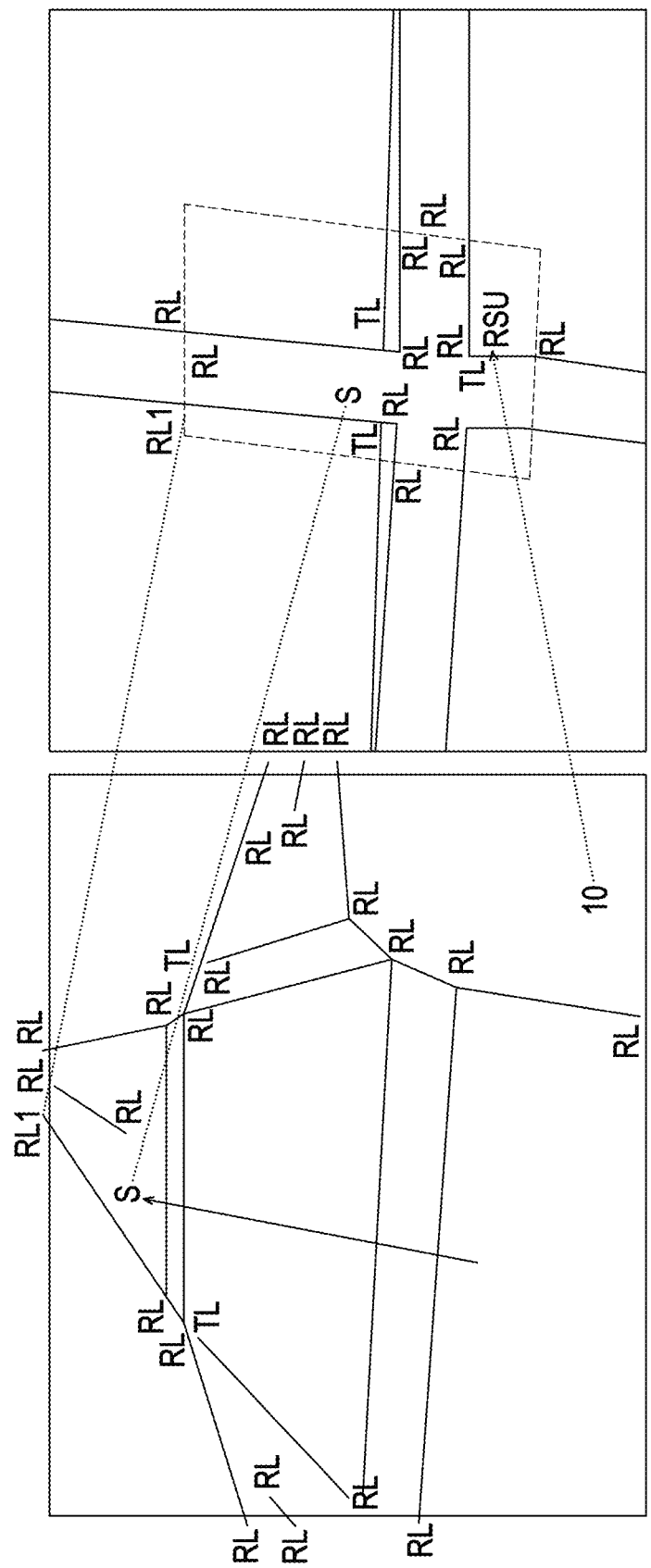
FIG. 7B is a schematic diagram of mapping into an electronic map according to an embodiment of the invention.

In an embodiment, it is assumed that an electronic map uses non-calibrated object location information to locate an object before calibration. The computing device 20 may calibrate the location of the object in the electronic map according to the calibrated object location information. Since the object estimation location merged with the image identification result is more accurate than the original object location information, the object presented by the electronic map based on the object estimation location may be indeed located on a road or sidewalk. Moreover, if the image identification result includes a road line, the computing device 20 may further determine a relative position relationship between an object and the road line, and determine that the calibrated object location information is complied with the relative position relationship between the object and the road line in the image. For example, FIG. 7B is a schematic diagram of mapping into an electronic map according to an embodiment of the invention. Referring to FIG. 7B, the motorcycle S may be indeed located on the road of the electronic map.

Figure 8A:
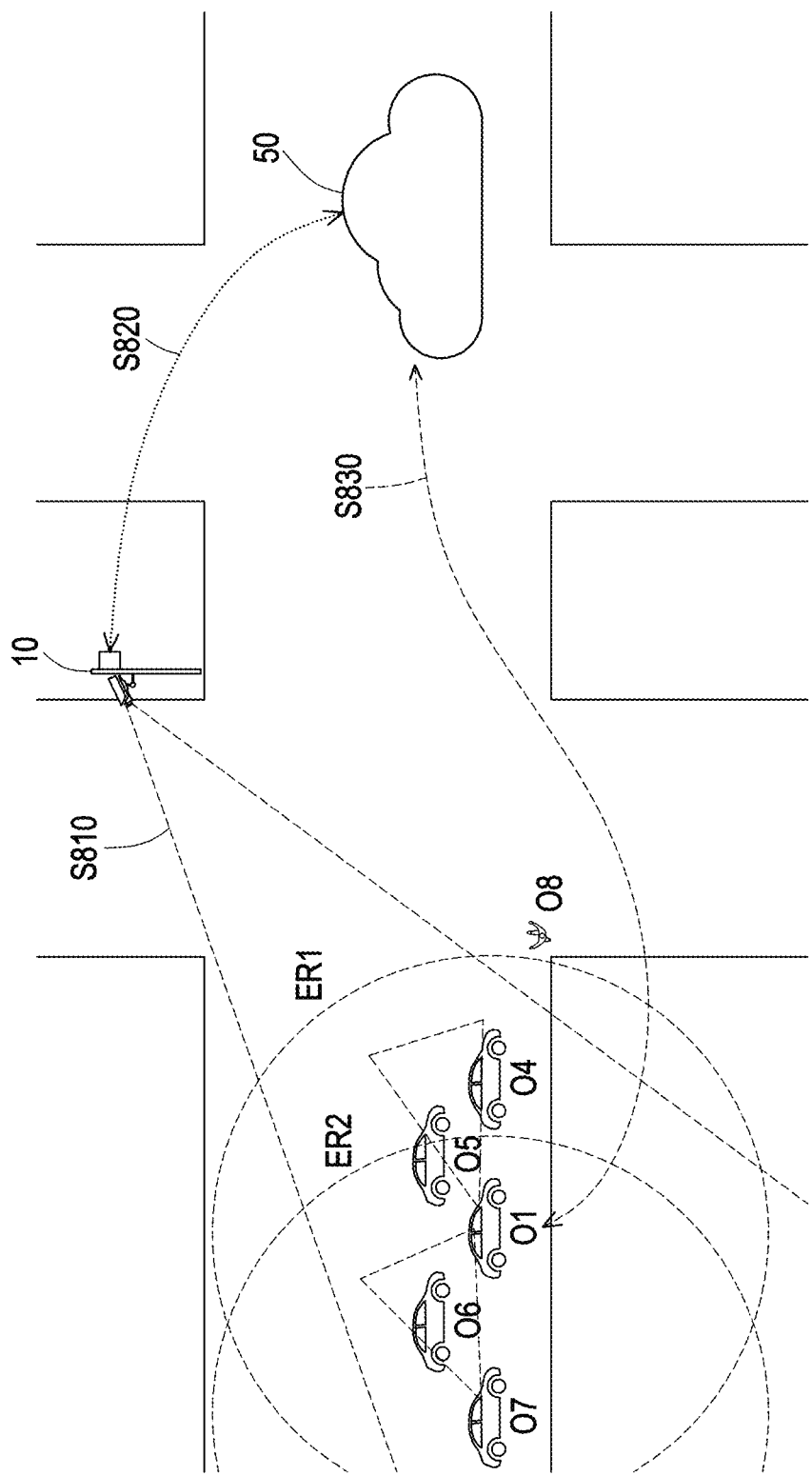
FIG. 8A and FIG. 8B are schematic diagrams of locations of objects and a roadside unit in an application situation according to an embodiment of the invention.
Figure 8B:
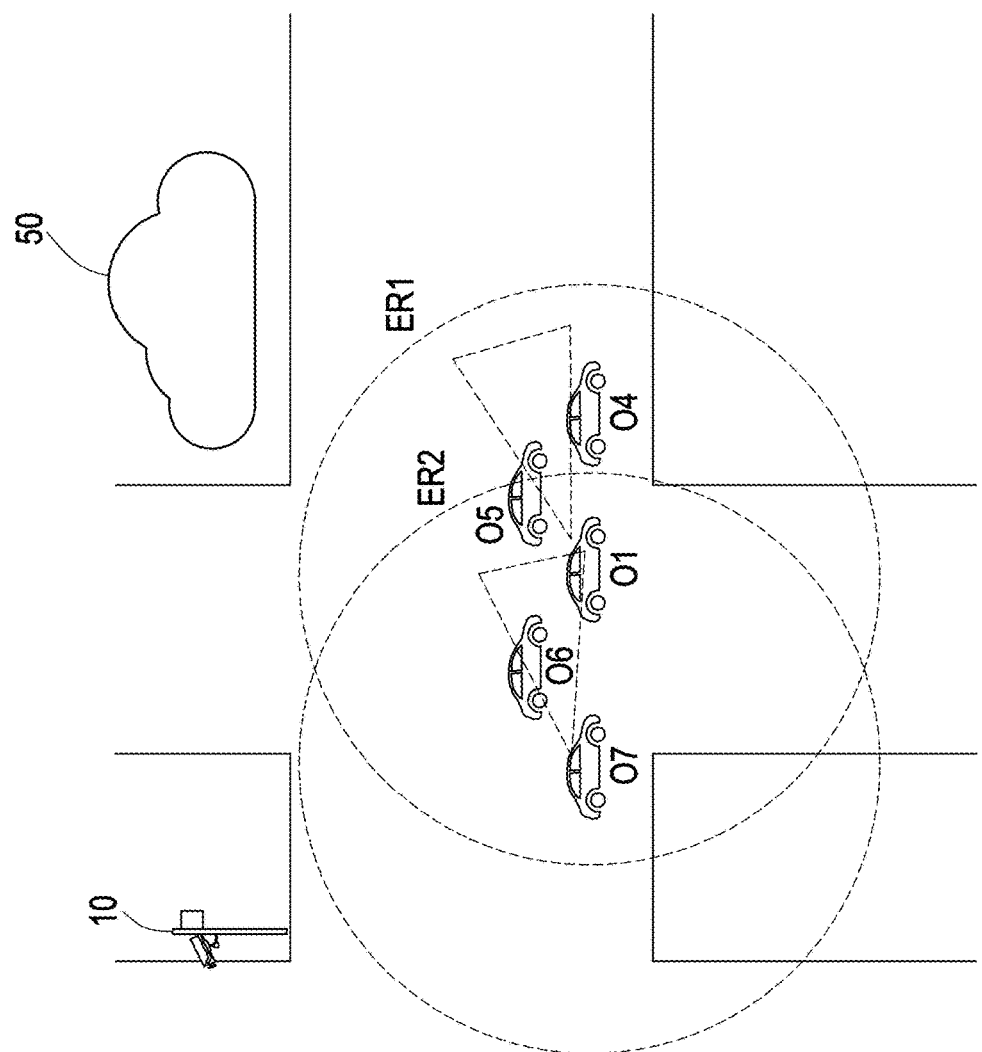

Two application situations are further described below. FIG. 8A and FIG. 8B are schematic diagrams of locations of objects and the roadside unit 10 in an application situation according to an embodiment of the invention. Referring to FIG. 8A, an observation result of an object O7 on the surrounding objects is consistent with an observation result of the object O1 (for example, there are surrounding objects in the front and left front), but the two objects O7 and O1 have satellite positioning errors ER1 and ER2. Therefore, if it is only based on the satellite positioning and the forward images of the objects O1 and O7, the cloud server 50 may probably misjudge relative positions of the objects O1 to O7. The roadside unit 10 may obtain image identification results of the objects O1 to O7 (step S810), and determine the objects O1 and O7 and calibrate the locations of the objects O1 and O7 according to the image identification result (step S820). For example, the image identification result indicates that the object O7 is located behind the object O1. In addition, the cloud server 50 may provide the calibrated locations to the mobile devices 40 of the objects O1 and O7, and even notify the object O1 of a warning that an object O8 is ahead (step S830).

Referring to FIG. 8B, even if the objects O1 to O7 leave a detection range of the roadside unit 10, the cloud server 50 may still track the relative positions of all of the objects O1 to O7 based on the GPS coordinates continuously reported by the mobile devices 40 of the objects O1 to O7.

Figure 9:
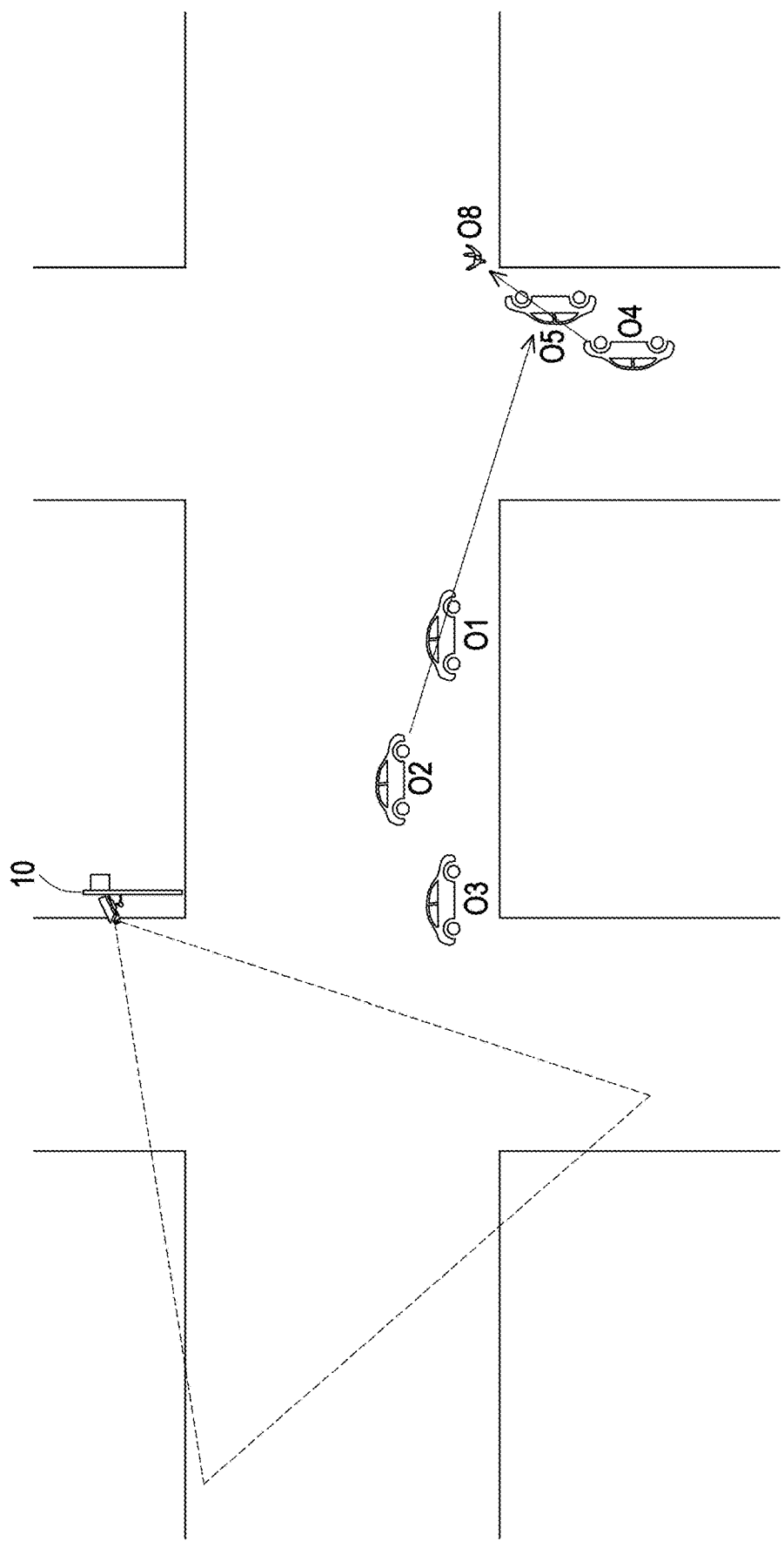
FIG. 9 is a schematic diagram of locations of objects and a roadside unit in another application situation according to an embodiment of the invention.

FIG. 9 is a schematic diagram of locations of objects and a roadside unit in another application situation according to an embodiment of the invention. Referring to FIG. 9, the object O2 is not within the detection range of the roadside unit 10 and the object O8 is located in a blind area of view of the image capturing device 30 of the object O2. In addition, the object O4 is not within the detection range of the roadside unit 10 and the object O8 is located in a blind area of view of the image capturing device 30 of the object O4. The mobile device 40 of the object O1 may share detection information of the object O8 to the mobile devices 40 of the object O2 and the object O3 via the cloud server 50. The mobile device 40 of the object O5 may share detection information of the object O8 to the mobile device 40 of the object O4 via the cloud server 50. In this way, the mobile devices 40 of the objects O2, O3 and O4 may all learn that there is the object O8 in the front.

Figure 10A:
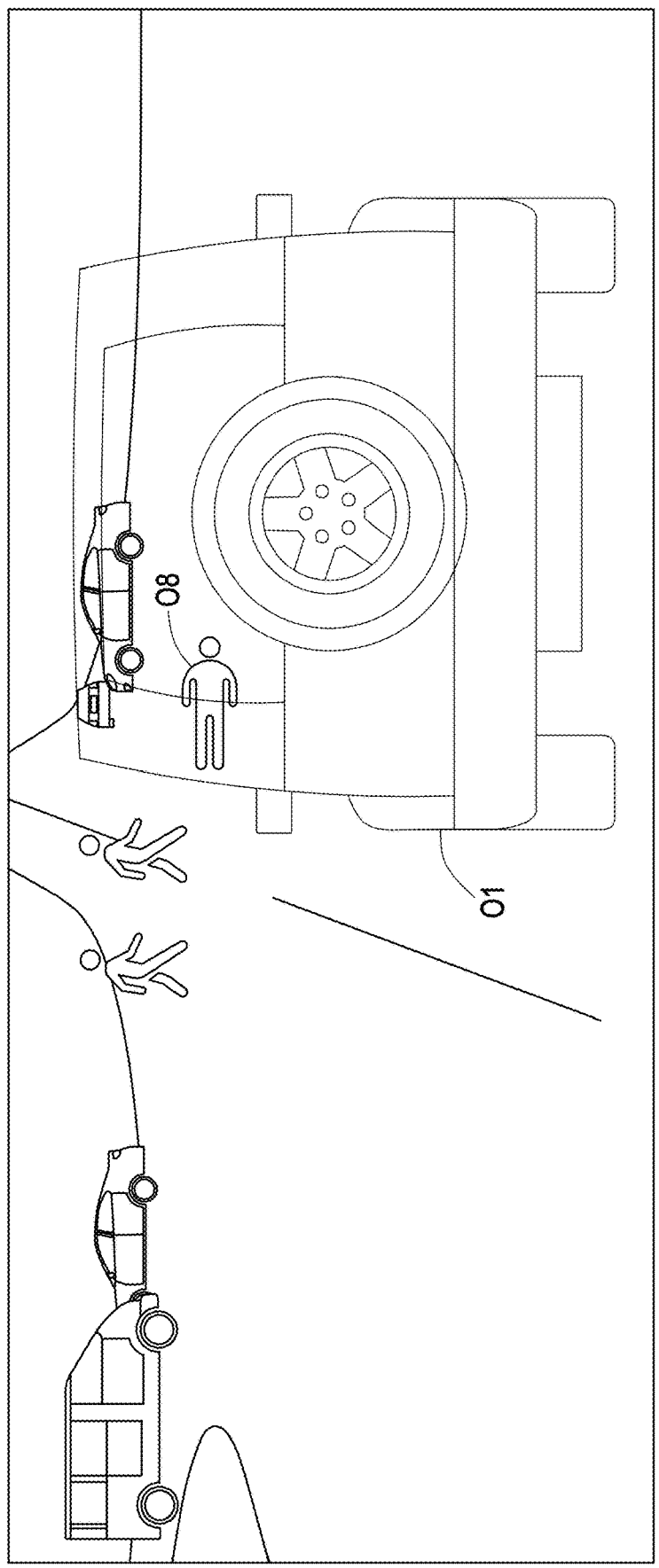
FIG. 10A is a schematic diagram of a first-person perspective according to an embodiment of the invention.

FIG. 10A is a schematic diagram of a first-person perspective according to an embodiment of the invention. Referring to FIG. 10A, in order to facilitate the user U in FIG. 1 using the mobile device 60 to clearly understand a road condition ahead, the mobile device 60 may present a first-person perspective image based on updated location information. It is assumed that the object O1 in front of the user U shields the object O8, the mobile device 60 may change transparency of the object O1 to present the object O8.

Figure 10B:
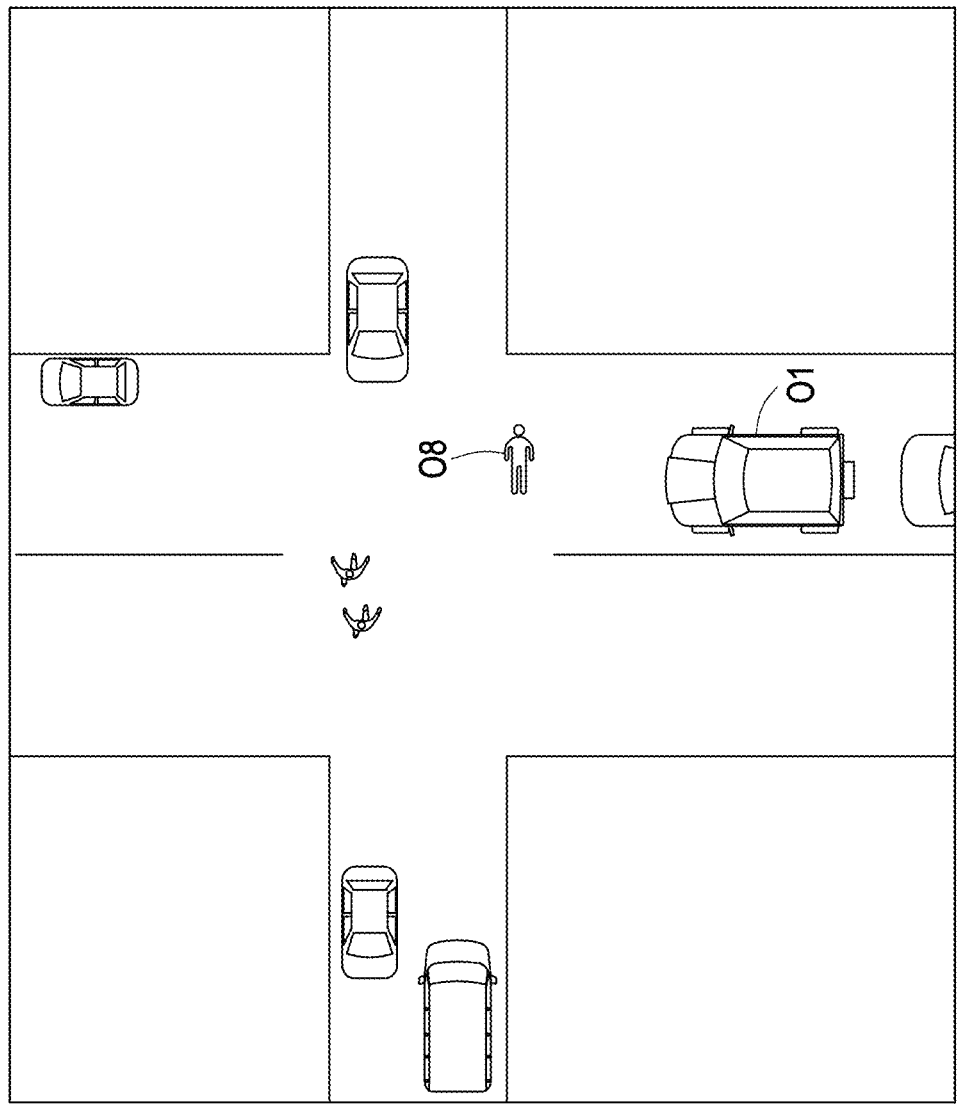
FIG. 10B is a schematic diagram of an electronic map of FIG. 10A.

FIG. 10B is a schematic diagram of an electronic map of FIG. 10A. Referring to FIG. 10B, the mobile device 60 may provide switching options of the electronic map, so as to facilitate the user U to learn a relative position of the object O8 or other objects. Moreover, for an emergency, an accident, or a condition threatening a travel route, the mobile device 60 may emphasize it by different colors (for example, red, blue), color gradients, or other visual effects, or even provide voices for reminding.

Figure 10C:
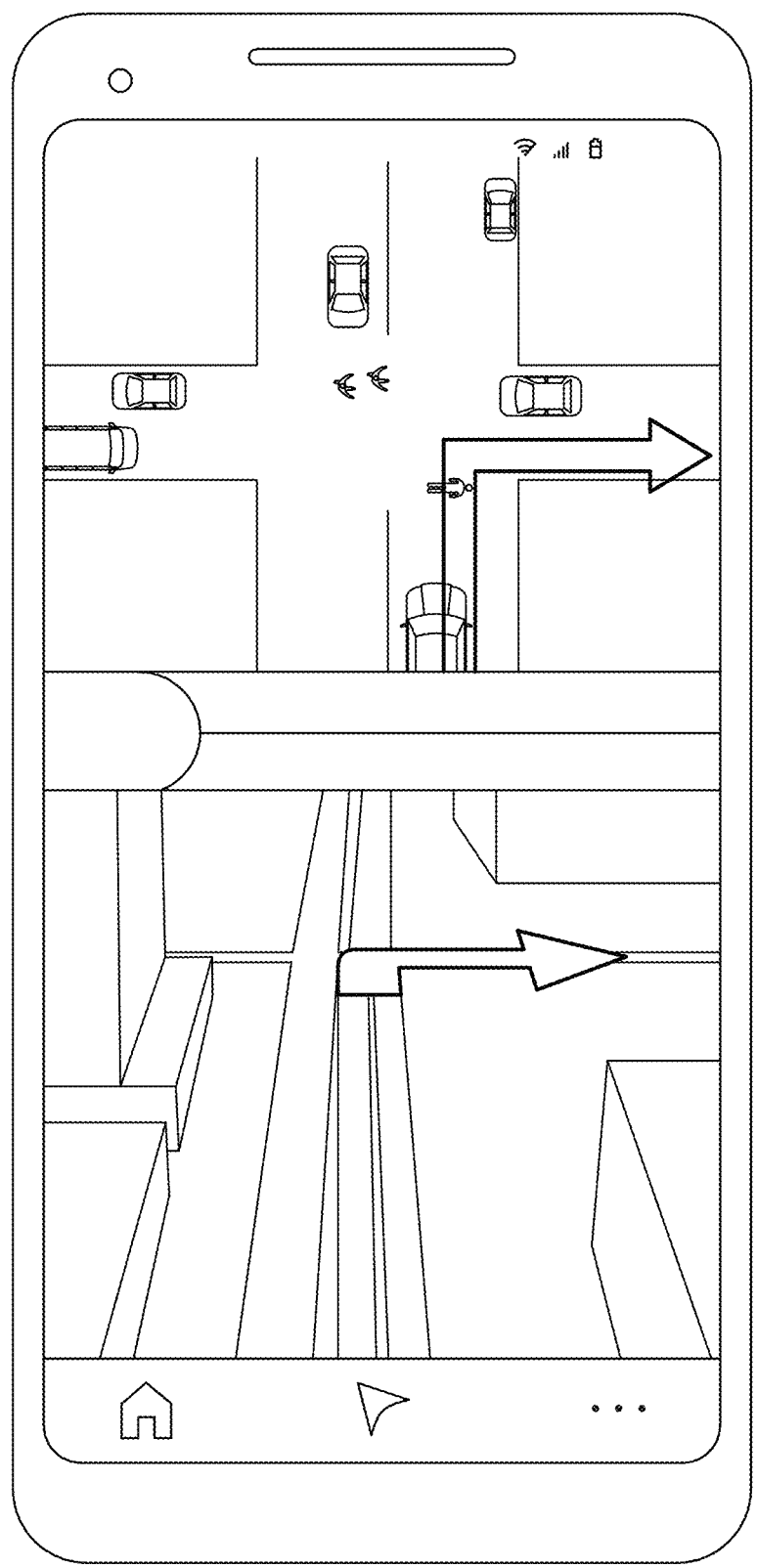
FIG. 10C illustrates integration of FIG. 10B into a navigation map.

The calibrated location information may also be further integrated into a navigation system. For example, FIG. 10C illustrates integration of FIG. 10B into a navigation map. Referring to FIG. 10C, the mobile device 60 may provide a direction and a location of a target of priority attention at an intersection according to a navigation route, and integrate the navigation route into the electronic map integrating the object locations as shown in the figure above. In this way, it is convenient for the user U to learn whether the emergency or accident is on the navigation route.

The electronic map may further integrate driving information of public transportation. When the public transportation approaches the navigation route or the user U, the mobile device 60 may issue an early warning. Alternatively, the electronic map can further integrate warning information of natural disasters or human disasters. When the navigation route or the user U approaches a disaster site, the mobile device 60 may issue an early warning.

Besides, the embodiment of the invention integrates the image identification result. Image identification may also detect things like signboards, house numbers, signals, road signs, or law enforcement cameras. If a navigation destination or the object on the route conforms to the image identification result, the mobile device 60 may further emphasize the identified specific object in the electronic map, the navigation system or a first-person perspective interface.

In summary, in the positioning system and the calibration method of an object location according to the embodiments of the invention, the relative positions of the surrounding objects are determined based on the image identification result. The roadside unit is used as a reference anchor point, and the object location information is calibrated based on the location of the roadside unit and the image identification result. The cloud server integrates and shares the information of all devices, so that the mobile devices or the roadside unit may all learn a complete condition of the objects on the road or in the monitoring area. In this way, accurate location estimation may be provided, and an early warning may be issued accordingly.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A calibration method of an object location, comprising:
   obtaining roadside location information of at least one roadside unit;
   obtaining object location information of at least one object through a satellite positioning system;
   determining an image identification result of the at least one object or the at least one roadside unit according to an image of the at least one image capturing device; and
   calibrating the object location information of the at least one object with an error from the satellite positioning system according to the roadside location information and the image identification result.

2. The calibration method of object location as claimed in claim 1, wherein the roadside location information is a location of the at least one roadside unit, the image identification result is a location of the at least one roadside unit in the image, and the step of calibrating the object location information of the at least one object according to the roadside location information and the image identification result comprises:
   determining a first location conversion relationship between the roadside location information and the image identification result; and
   calibrating the object location information according to the first location conversion relationship.

3. The calibration method of object location as claimed in claim 2, wherein the step of calibrating the object location information according to the first location conversion relationship comprises:
   converting a location of the at least one object in the image into a corresponding object estimation location according to the first location conversion relationship; and
   calibrating the object location information according to the object estimation location.

4. The calibration method of object location as claimed in claim 2, wherein a coordinate distance between the roadside location information and the object location information of the at least one object is related to the first location conversion relationship.

5. The calibration method of object location as claimed in claim 2, wherein the at least one image capturing device captures a plurality of images, the images correspond to a plurality of different timestamps, and the step of determining the first location conversion relationship between the roadside location information and the image identification result comprises:
   determining an object estimation location of the at least one object under different timestamps according to the first location conversion relationship of the timestamps.

6. The calibration method of object location as claimed in claim 1, wherein the roadside location information is an object estimation location of the at least one object, the image identification result is a location of the at least one object in the image, and the step of calibrating the object location information of the at least one object according to the roadside location information and the image identification result comprises:
    determining a second location conversion relationship between the roadside location information and the image identification result; and
    calibrating the object location information according to the second location conversion relationship.

7. The calibration method of object location as claimed in claim 6, wherein the step of determining the second location conversion relationship between the roadside location information and the image identification result comprises:
    determining a preliminary estimation location information of the at least one object according to the image identification result; and
    determining the second location conversion relationship according to an error between the preliminary estimation location information and the roadside location information.

8. The calibration method of object location as claimed in claim 6, wherein the image identification result further comprises at least one of a type, an appearance, and identification information of the at least one object, and the calibration method further comprises:
    mapping the object estimation location of the at least one object in the roadside location information to the object estimation location reported by a device according to at least one of the type, the appearance, and the identification information of the at least one object.

9. The calibration method of object location as claimed in claim 6, wherein the object location information corresponds to an identification code of the at least one object, and the calibration method further comprises:
    mapping the object estimation location to the object estimation location reported by a device according to the identification code of the at least one object.

10. The calibration method of object location as claimed in claim 6, further comprising:
    calibrating a location of the at least one object in an electronic map according to the object location information which is calibrated, wherein the electronic map uses the object location information which is not calibrated to position the at least one object before calibration.

11. A positioning system, comprising:
    at least one roadside unit, configured to provide roadside location information;
    at least one image capturing device, configured to provide an image; and
    a computing device, configured to:
        obtain the roadside location information of the at least one roadside unit;
        obtain object location information of at least one object through a satellite positioning system; and
        calibrate the object location information of the at least one object with an error from the satellite positioning system according to the roadside location information and an image identification result, wherein the image identification result is for the at least one object or the at least one roadside unit and is determined according to the image of the at least one image capturing device.

12. The positioning system as claimed in claim 11, wherein the roadside location information is a location of the at least one roadside unit, the image identification result is a location of the at least one roadside unit in the image, and the computing device is further configured to:
    determine a first location conversion relationship between the roadside location information and the image identification result; and
    calibrate the object location information according to the first location conversion relationship.

13. The positioning system as claimed in claim 12, wherein the computing device is further configured to:
    convert a location of the at least one object in the image into a corresponding object estimation location according to the first location conversion relationship; and
    calibrate the object location information according to the object estimation location.

14. The positioning system as claimed in claim 12, wherein a coordinate distance between the roadside location information and the object location information of the at least one object is related to the first location conversion relationship.

15. The positioning system as claimed in claim 12, wherein the at least one image capturing device captures a plurality of images, the images correspond to a plurality of different timestamps, and the computing device is further configured to:
    determine an object estimation location of the at least one object under different timestamps according to the first location conversion relationship of the timestamps.

16. The positioning system as claimed in claim 11, wherein the roadside location information is an object estimation location of the at least one object, the image identification result is a location of the at least one object in the image, and the computing device is further configured to:
    determine a second location conversion relationship between the roadside location information and the image identification result; and
    calibrate the object location information according to the second location conversion relationship.

17. The positioning system as claimed in claim 16, wherein the computing device is further configured to:
    determine a preliminary estimation location information of the at least one object according to the image identification result; and
    determine the second location conversion relationship according to an error between the preliminary estimation location information and the roadside location information.

18. The positioning system as claimed in claim 16, wherein the image identification result further comprises at least one of a type, an appearance, and identification information of the at least one object, and the computing device is further configured to:
    map the object estimation location of the at least one object in the roadside location information to the object estimation location reported by a device according to at least one of the type, the appearance, and the identification information of the at least one object.

19. The positioning system as claimed in claim 16, wherein the object location information corresponds to an identification code of the at least one object, and the computing device is further configured to:
    map the object estimation location to the object estimation location reported by a device according to the identification code of the at least one object.

20. The positioning system as claimed in claim 16, wherein the computing device is further configured to:
 calibrate a location of the at least one object in an electronic map according to the object location information which is calibrated, wherein the electronic map uses the object location information which is not calibrated to position the at least one object before calibration.

\* \* \* \* \*